United States Patent
Atwell

[19]

[11] Patent Number: 6,122,371
[45] Date of Patent: *Sep. 19, 2000

[54] APPARATUS FOR PROTECTING COIN-OPERATED TELEPHONES FROM VANDALISM AND LARCENY

[76] Inventor: Ronald C. Atwell, 6598 Stonetrace Dr., Bartlett, Tenn. 38135

[*] Notice: This patent issued on a continued prosecution application filed under 37 CFR 1.53(d), and is subject to the twenty year patent term provisions of 35 U.S.C. 154(a)(2).

[21] Appl. No.: 08/898,573

[22] Filed: Jul. 22, 1997

[51] Int. Cl.[7] ........................................................ H04M 1/00
[52] U.S. Cl. ............................................. 379/453; 379/451
[58] Field of Search ..................................... 379/451, 439, 379/453, 143–145

[56] References Cited

U.S. PATENT DOCUMENTS

| | | |
|---|---|---|
| 3,213,210 | 10/1965 | Samples .................................... 379/143 |
| 4,254,308 | 3/1981 | Blomeyer et al. . |
| 4,396,176 | 8/1983 | Hannula ................................... 379/145 |
| 5,131,035 | 7/1992 | Ohayon . |
| 5,381,469 | 1/1995 | Zausner . |
| 5,402,476 | 3/1995 | Ohayon . |
| 5,509,057 | 4/1996 | Anello et al. ............................. 379/451 |
| 5,555,296 | 9/1996 | McCloskey .............................. 379/145 |
| 5,590,191 | 12/1996 | Guevara . |

OTHER PUBLICATIONS

International Search Report issued in PCT/US98/14694 dated Dec. 22, 1998.

*Primary Examiner*—Jack Chiang
*Attorney, Agent, or Firm*—Geoff L. Sutcliffe, Esq.; James L. Ewing, IV, Esq.; Kilpatrick Stockton LLP

[57] ABSTRACT

An apparatus for protecting telephones from vandalism includes a front member for covering the coin box access door plate. The front member includes a pair of apertures or cut outs for allowing access to the coin return slot and to allow the cover for the coin return slot to pivot inwardly. The apparatus may be easily installed on a telephone by removing the upper housing, sliding the apparatus over and around the lower housing of the telephone, and then returning the upper housing to its normally locked position on the telephone. The apparatus protects the telephone from vandalism and larceny without requiring any additional locks. The apparatus may be quickly and easily removed and replaced during the collection process and is preferably comprised of a single piece unit formed of ⅜ inch steel.

19 Claims, 4 Drawing Sheets

APPARATUS FOR PROTECTING COIN-OPERATED TELEPHONES FROM VANDALISM AND LARCENY

FIELD OF THE INVENTION

The present invention relates to apparatus for protecting coin-operated telephones and, more particularly, to apparatus for protecting cash compartments of coin-operated telephones from vandalism and larceny.

BACKGROUND OF THE INVENTION

A conventional coin-operated telephone, such as the one shown in FIG. 1, includes a telephone box 12 having a front panel 14 and side 36. The telephone 10 includes a coin slot 16 for receiving coins and a coin transport clearing lever 18 for clearing coins that may have jammed within the telephone 10. The telephone 10 also includes a push button array 20 for dialing desired numbers, a head-set cradle 22, and a handset 38. The telephone 10 further includes coin return slot 28 having a return slot cover 30 which pivots about pin 60. The manner in which the telephone 10 is used to make a call is well known and accordingly its description will be omitted.

The telephone 10 also includes a pair of locks 26 and 34 for permitting access to a coin box access door plate 24. The lock 26 is a coin box lock and is located on the front panel 14 of the telephone 10 and operates in conjunction with lock 34 to allow access to the coin box. The telephone 10 also includes lock 32 to allow access to the telephone's interior by authorized personnel. Through lock 32, authorized personnel can remove an upper housing 17 of the telephone 10 and perform such tasks as replacing the keypad 20 or maintaining or repairing other components of the telephone 10.

The coin-operated telephone 10 is often the target of vandalism and larceny. Because the coin box within the telephone 10 can hold a large number of coins, thieves often damage the telephone 10 in order to gain access to this money. One common way in which thieves access the coin box is by prying off the coin box access door plate 24. In prying off the coin box access door plate 24, thieves subject the telephone 10 to considerable damage, including damage to the coin return slot 28, return slot cover 30, and other portions of the front panel 14 of the telephone 10. As a result, after the coin box has been stolen from the telephone 10, the entire telephone 10 must be removed and replaced with a new telephone 10.

Telephone companies incur substantial expenses due to this type of vandalism. For instance, the telephone companies not only lose revenue from the money in the coin box, but must also incur considerable expenses in repeatedly replacing the telephones 10. The telephone companies also realize increased labor costs in having their personnel periodically replace the damaged telephones 10.

It is therefore a desire to protect coin-operated telephones 10 from this type of vandalism and larceny. Any device or apparatus used to protect the telephone 10 from vandalism, however, must still permit authorized personnel to access the coin box. Any device or apparatus that protects the coin box should also be compatible with existing telephones 10 and not require the entire replacement of the entire telephone 10.

One apparatus that is commonly used to protect a public coin-operated telephone 10 from vandalism is comprised of a number of locks. One such lock is used to secure a plate across the coin box access door plate 24 and coin return slot cover 30. The plate across the coin box access door plate 24 includes two apertures or cut outs with a first one allowing a user to insert his or her finger into the coin return slot 28 and a second one of the apertures or openings to allow the top end of the coin return slot cover 30 to pivot inwardly. The second lock secures a second plate across the mid portion of the telephone 10, thereby locking the telephone 10 in place. This common device, however, has an intimidating appearance and is rather difficult to install on a telephone 10.

SUMMARY OF THE INVENTION

The present invention solves the problems described above by providing an apparatus for protecting a coin-operated telephone which may be easily installed on the telephone. The apparatus allows the normal use of the telephone while thwarting efforts to pry off a coin box access door plate from the telephone. The apparatus according to the invention, moreover, may be easily removed and reinstalled by personnel responsible for collecting money from the telephone.

According to a preferred embodiment, an apparatus according to the invention comprises a front member for extending across the coin access door plate of a coin-operated telephone. The apparatus includes a generally rectangular band that is placed around the telephone and is locked in place by an outer housing of the telephone. The front member of the apparatus is joined to the band by integral side members. The apparatus is preferably formed of a single piece structure and is comprised of stainless steel.

Accordingly, it is an object of the present invention to provide an apparatus that enables normal operation of the telephone.

It is another object of the present invention to provide an apparatus for protecting a telephone from vandalism to the coin box access door plate.

It is a further object of the present invention to provide an apparatus for protecting a telephone from vandalism which does not require any additional locks.

It is yet a further object of the present invention to provide an apparatus for protecting a telephone from vandalism which may be easily removed and replaced during the collection of money from the coin box.

Other objects, features and advantages of the present invention are apparent in the remainder of this document.

BRIEF DESCRIPTION OF THE DRAWINGS

The accompanying drawings, which are incorporated in and form a part of the specification, illustrate preferred embodiments of the present invention and, together with the description, serve to explain the principles of the invention. In the drawings.

DETAILED DESCRIPTION

Figure 1:
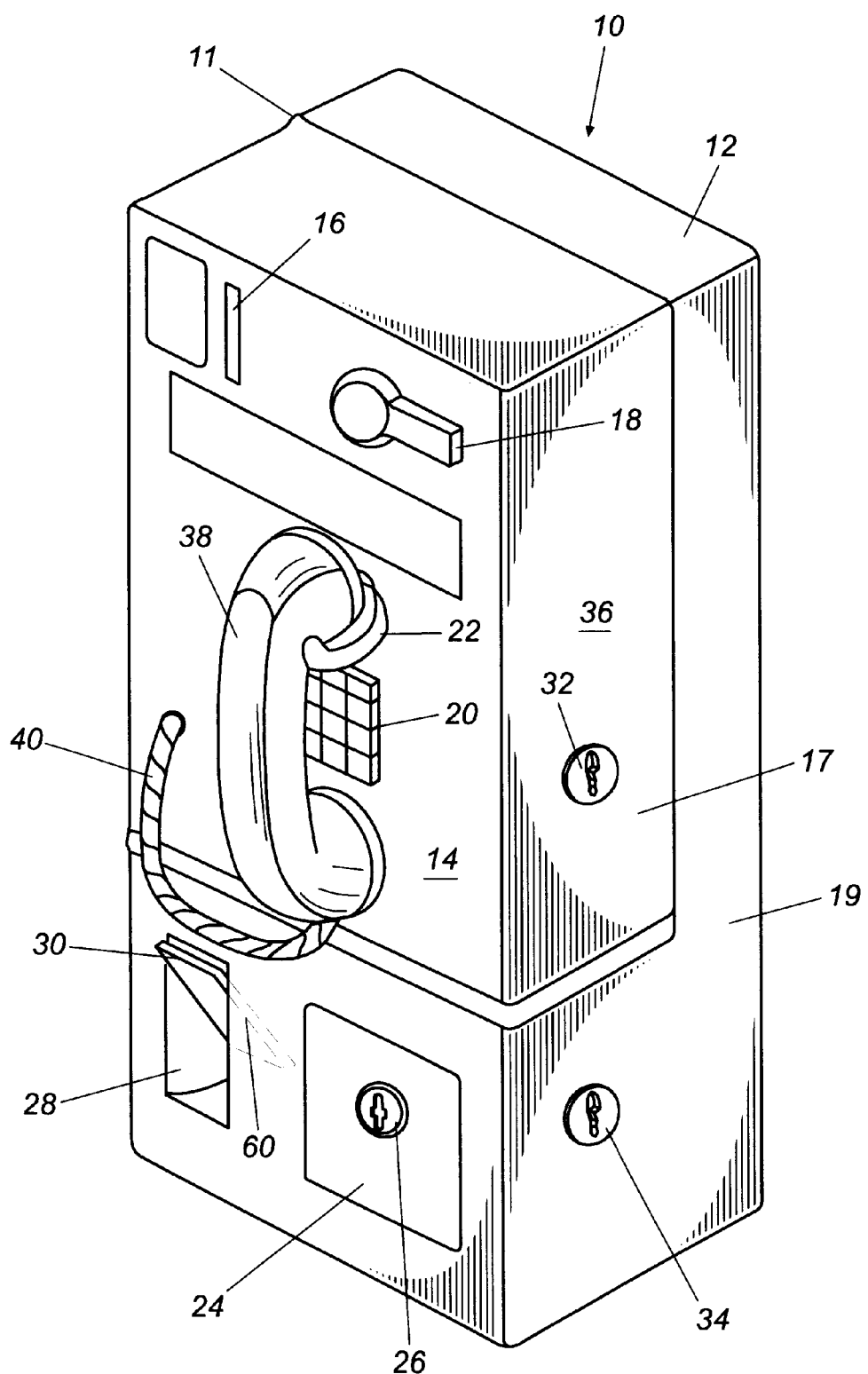
FIG. 1 is a perspective view of a conventional coin-operated telephone.
Figure 2:
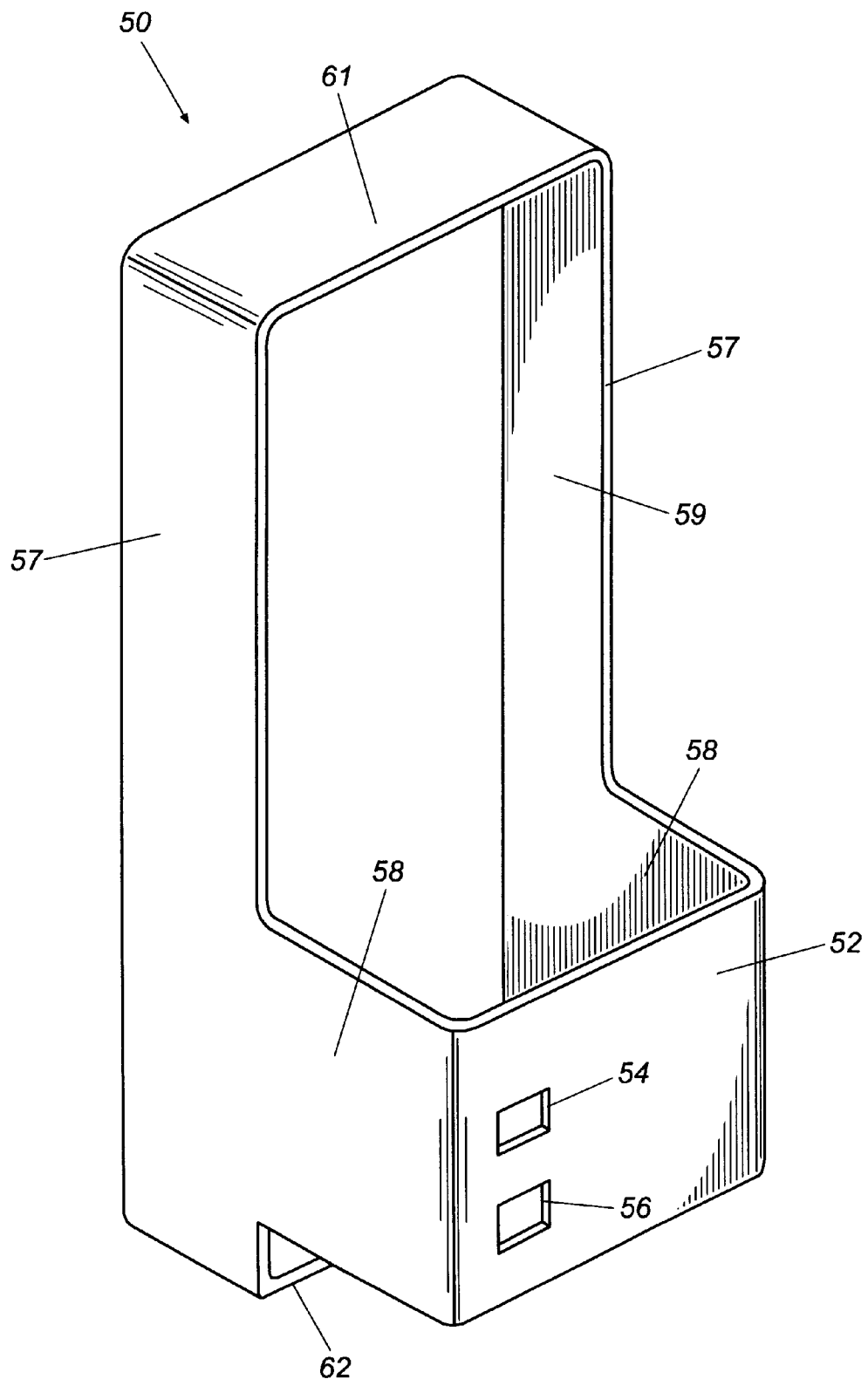
FIG. 2 is a perspective view of an apparatus for protecting the coin-operated telephone according to a preferred embodiment of the invention.

Reference will now be made in detail to preferred embodiments of the invention, non-limiting examples of which are illustrated in the accompanying drawings. With reference to FIG. 2, an apparatus 50 according to the invention comprises a front member 52 having a pair of apertures 54 and 56. As shown in the figures, the apertures 54 and 56 are generally rectangular-shaped and are aligned with each other in a vertical direction. The apparatus 50 also includes a generally band-like structure formed by side members 57 which extend in the vertical direction, a top member 61, and a bottom member 62. The purpose of the band-like structure will be apparent from the description below. The front member 52 of the apparatus 50 is joined with the vertically extending side members 57 by side members 58 which extend along the horizontal direction. The apparatus 50 is preferably formed from a single piece structure by welding together ⅜ inch steel plates.

Figure 3:
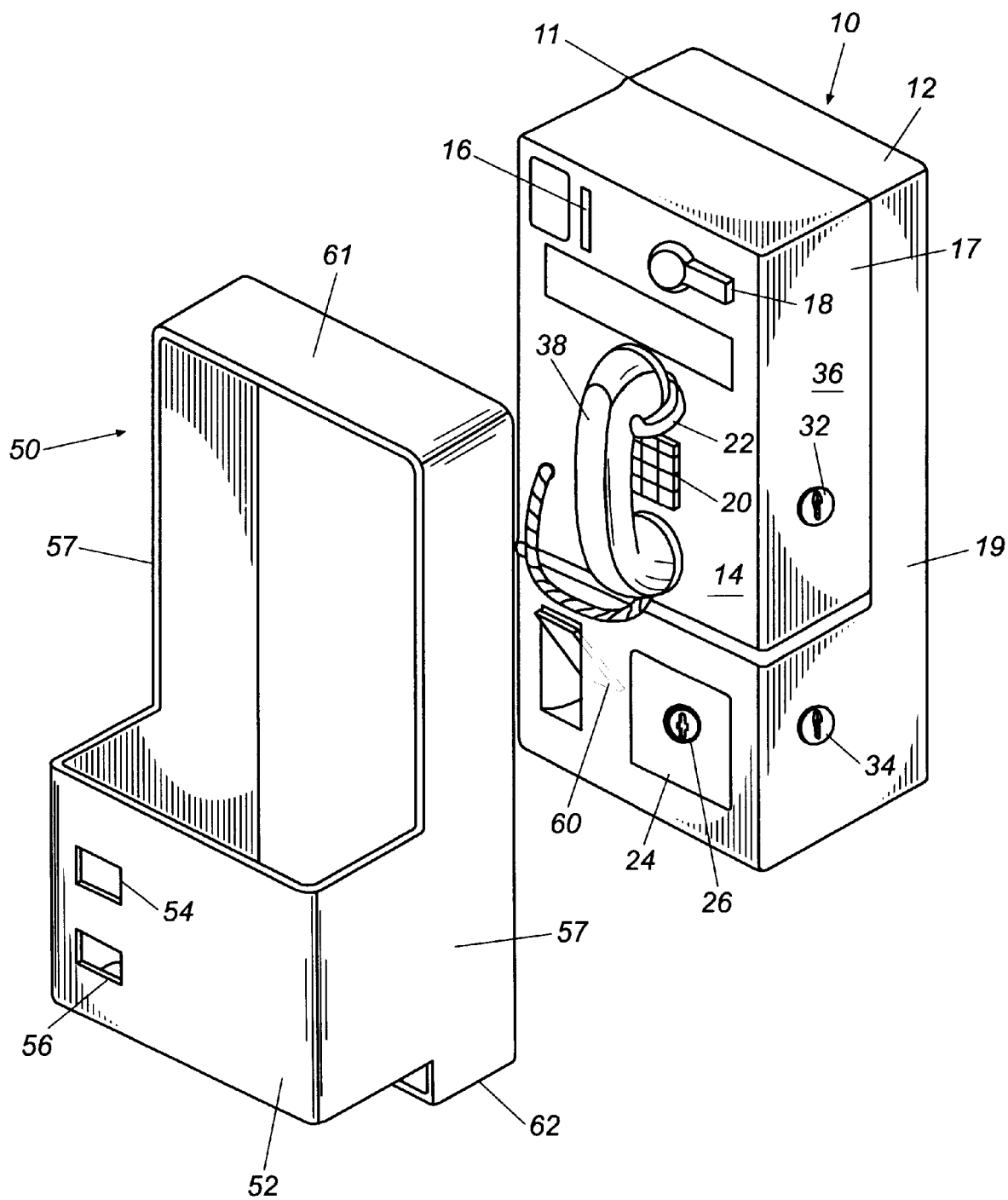
FIG. 3 is a perspective view illustrating the installation of the apparatus of FIG. 2 onto a coin-operated telephone.
Figure 4:
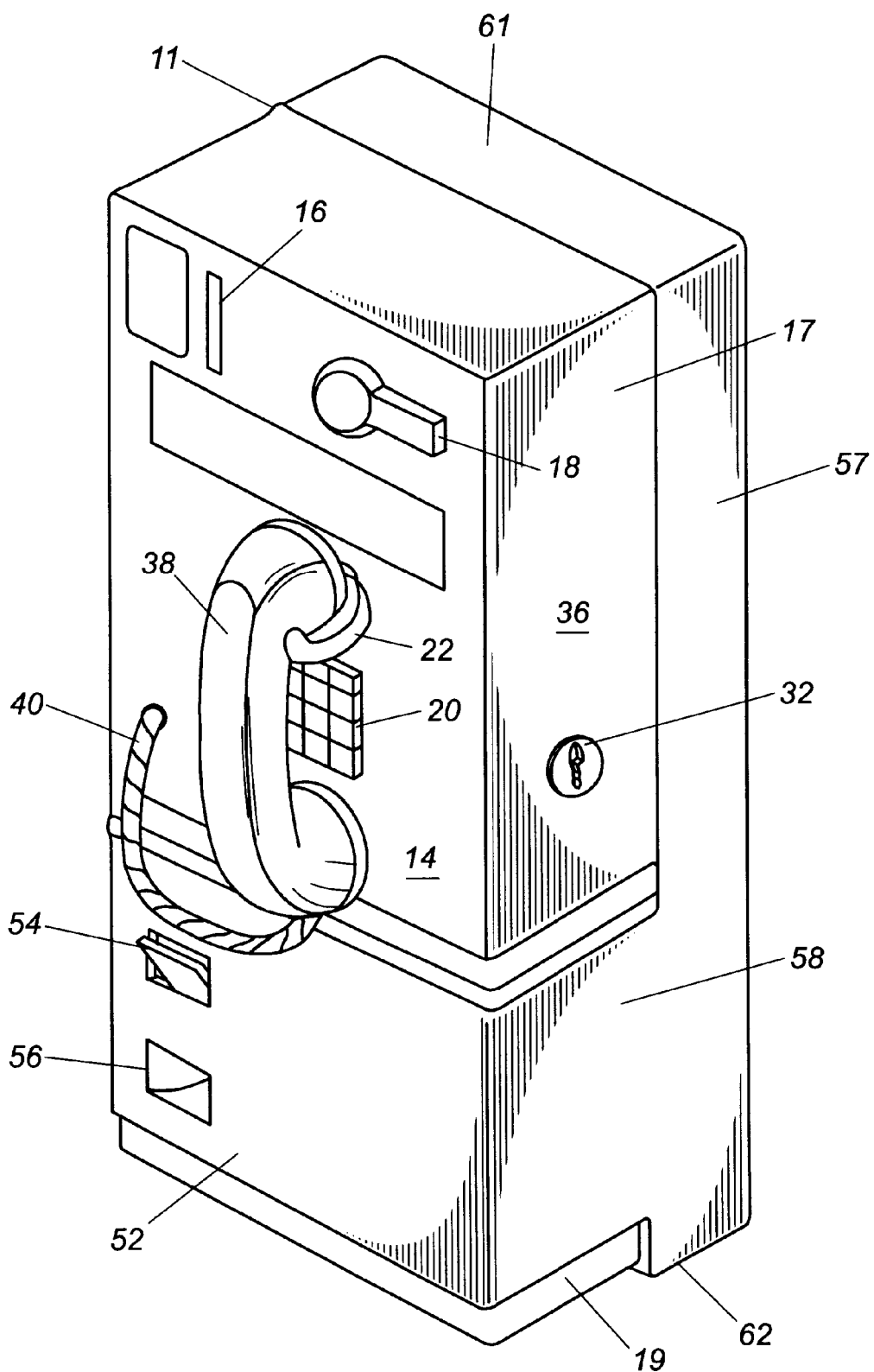
FIG. 4 is a perspective view of the apparatus for protecting the telephone installed on the telephone.

With reference to FIGS. 3 and 4, the apparatus 50 is placed over the front of the telephone 10. In its installed position, the front member 52 of the apparatus 50 completely covers the coin box access door plate 24 as well as the lock 34. The apparatus 50 does not interfere with normal usage of the telephone 10. Instead, aperture 54 is positioned to allow the coin return slot cover 30 to pivot inwardly to reveal the contents of the coin return slot 28 and aperture 56 is positioned to allow the user to insert his or her finger into the coin return slot 28.

To install the apparatus 50, the upper housing 17 of the telephone 10 is removed and is set aside. A lower housing 19 of the telephone 10 is not removed during the installation of the apparatus 50. Next, the apparatus 50 is slid over and around the lower housing 19 of the telephone 10. In the example shown in FIG. 4, the front member 52 of the apparatus 50 completely covers the coin box access door plate 24 rendering it difficult to pry off the coin box access door plate 24. To complete installation of the apparatus 50 to the telephone 10, the upper housing 17 of the telephone 10 is returned to its normally locked position on the telephone 10. The upper housing 17, as shown in the figures, has a raised lip 11 formed around its periphery. The apparatus 50 is dimensioned so that inner surfaces 59 of the side members 57 are close, if not contacting, the lower housing 19 along each side of the telephone 10. Thus, when the upper housing 17 is replaced and locked into position, the lip 11 of the upper housing 17 acts as a stopper preventing the apparatus 50 from sliding in a forward direction. The upper housing 17 therefore secures the apparatus 50 to the telephone 10. The top member 61 of the apparatus 50 is also close, if not contacting, the top of the telephone 10 and is prevented from moving forward by the lip 11 of the upper housing 17.

As should be apparent to those skilled in the art from the above description, the apparatus 50 may be easily installed on existing telephones 10. The apparatus 50 requires no additional locks but instead is formed of a single unitary piece that can be locked in place with the upper housing 17 and existing lock 32. Further, the apparatus 50 can protect the coin box of the telephone 10 and can be easily removed and replaced during the collection process in less than a minute.

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, while the apparatus 50 is preferably a single structure formed by welding together plates of sheet metal the apparatus 50 may be formed of more than one part that is joined by ways other than welding. Further, although the apparatus 50 is preferably comprised of stainless steel, the apparatus 50 may be comprised of other materials.

In the example shown, the front member 14 of the apparatus 50 completely covers the coin box access plate 24 but terminates just above the bottom of the telephone 10. The bottom member 62 may completely cover and protect the bottom of the telephone 10 whereby the front member 52 of the apparatus 50 would wrap around the telephone 10 and join the bottom member 61. Also, the apparatus 50 may be formed without any bottom member 62. The front member 14, on the other hand, may terminate farther away from the bottom of the telephone 10. For instance, the front member 14 of the apparatus 50 may terminate along the length of the coin return slot 28 whereby aperture 56 may comprise a cut-out not bounded by the apparatus 50. In a similar manner, the top of the front member 14 may terminate lower than that shown and aperture 54 may comprise a cut-out not bounded by the apparatus 50. Additionally, the apertures 54 and 56 need not be square or rectangular shaped but instead may have other shapes.

The apparatus 50 has been shown with reference to a coin-operated telephone 10 that is not recessed. The apparatus 50, however, may be used with recessed telephones as well. To protect a recessed telephone 10, one or more 178A backboards may be joined together and act as a spacer to extend the telephone forward in the enclosure.

The embodiment was chosen and described in order to explain the principles of the invention and their practical application so as to enable others skilled in the art to utilize the invention and various embodiments and with various modifications as are suited to the particular use contemplated.

What is claimed is:

1. An apparatus for protecting a coin-operated telephone from vandalism, comprising:

a front member for extending across a coin box access door plate, for permitting access to a coin return slot, and for allowing a coin return slot cover to pivot inwardly;

vertically extending side members for being positioned on either side of the telephone;

a top member for being positioned on top of the telephone; and horizontally extending side members for being positioned on either side of the telephone and for joining the front member to the vertically extending side members;

wherein the front member is dimensioned to extend no higher than an upper housing of the telephone when the apparatus is placed on the telephone, at least one of the front member, horizontally extending side members, vertically extending side members, and top member is secured to the telephone by the upper housing of the telephone, the vertically extending side members and the top member define an aperture at the rear of the apparatus for receiving the telephone, and wherein the aperture is sized to permit the apparatus to be positioned over the telephone while the telephone remains mounted.

2. The apparatus as set forth in claim 1, further comprising a bottom member for being positioned below the telephone and for joining the vertically extending sides.

3. The apparatus as set forth in claim 1, wherein the apparatus comprises stainless steel.

4. The apparatus as set forth in claim 1, wherein one of the horizontally extending side members is for covering a lock for a lower housing of the telephone.

5. The apparatus as set forth in claim 1, wherein the top member, front member, horizontally extending side members, and vertically extending side members are positioned over a lower housing of the telephone.

6. The apparatus as set forth in claim 1, wherein the at least one aperture in the front member comprises a pair of apertures with a first aperture for permitting access to the coin return slot and a second aperture for allowing the coin return slot cover to pivot inwardly.

7. The apparatus as set forth in claim 1, wherein the front member of the apparatus is secured to the telephone by the upper housing and is prevented from moving upwardly by a lip on the upper housing.

8. The apparatus as set forth in claim 1, wherein the horizontally extending side members of the apparatus are secured to the telephone by the upper housing and are prevented from moving upwardly by a lip on the upper housing.

9. The apparatus as set forth in claim 1, wherein the top member of the apparatus is secured to the telephone by the upper housing and is prevented from moving toward a front of the telephone by a lip on the upper housing.

10. The apparatus as set forth in claim 1, wherein the vertically extending side members of the apparatus are secured to the telephone by the upper housing and are prevented from moving toward a front of the telephone by a lip on the upper housing.

11. The apparatus as set forth in claim 1, wherein the front member, the vertically extending side members, the horizontally extending side members, and the top member of the apparatus are all secured to the telephone by the upper housing and are prevented from being removed from the telephone by a lip on the upper housing.

12. The apparatus as set forth in claim 1, wherein the front member, vertically extending side members, top member, and horizontally extending side members form a single unitary structure.

13. The apparatus as set forth in claim 1, wherein the vertically extending side members are spaced apart a distance greater than an outer width of the telephone.

14. The apparatus as set forth in claim 1, wherein the apparatus does not include any rear member that prevents the apparatus from being removed from the telephone after removal of the upper housing.

15. A one-piece apparatus for protecting a coin-operated telephone from vandalism, comprising:
   a front member for extending across a coin box access door plate;
   vertically extending side members for being positioned on either side of the telephone;
   a top member for being positioned on top of the telephone; and
   horizontally extending side members for being positioned on either side of the telephone for joining the front member to the vertically extending side members;
   wherein the front member, horizontally extending side members, vertically extending side members, and top member are dimensioned and spaced relative to each other such that the apparatus may receive the telephone and be held in position only by an upper housing of the telephone and wherein the front member, horizontally extending side members, vertically extending side members, and top member are integral to each other to form the one-piece apparatus.

16. The apparatus of claim 1, wherein the front and horizontally extending side members do not extend vertically in height beyond the upper edges of a lower housing of the telephone having the coin box.

17. The apparatus of claim 15, wherein the front and horizontally extending side members do not extend vertically in height beyond the upper edges of a lower housing of the telephone the coin box.

18. The apparatus of claim 1, wherein when the apparatus is placed on the telephone the front member is placed over the coin box situated in a lower housing of the telephone and the vertically extending side members are placed behind the upper housing of the telephone.

19. The apparatus of claim 15, wherein when the apparatus is placed on the telephone the front member is placed over the coin box situated in a lower housing of the telephone and the vertically extending side members are placed behind the upper housing of the telephone.

* * * * *